Oct. 19, 1926.

J. F. METTEN 1,603,968

HEAT INSULATING STRUCTURE

Filed Nov. 17, 1925

Inventor
John F. Metten
By his Attorneys

Patented Oct. 19, 1926.

1,603,968

UNITED STATES PATENT OFFICE.

JOHN F. METTEN, OF PHILADELPHIA, PENNSYLVANIA.

HEAT-INSULATING STRUCTURE.

Application filed November 17, 1925. Serial No. 69,627.

This invention relates to heat insulation of piping, and particularly ship piping and similar work where pipes or fittings carrying high temperature steam have to pass through bulkheads, decks and partitions.

The usual practice is to fit such pipes with a flange for direct attachment to the partition. In steel ships in particular, this results in a high rate of heat flow into the structure of the ship adjacent to such attachments. The conductivity of the steel flanges is in proportion to the area of metallic contact and the conductivity of the material, and also to the cross-sectional area or thickness of the metal wall to which it is attached, varying in proportion to the difference in temperatures involved. The steady increase in steam pressures and increasing use of superheat with steam pressures corresponding to temperatures ranging from 400 to 700° F. have carried the heat losses resulting from these connections to reach serious proportions. In addition the high temperatures transmitted to the bulk-heads, particularly in the neighborhood of quarters, have a serious effect upon the temperatures of the rooms.

In order to overcome these objections, this invention provides for insulating the attachment by the introduction of insulating collars between the pipe and bulkhead by a method of construction that will permit the collars to be molded in standard sizes of suitable material of minimum heat conductivity and the necessary high resistance to pressure. The connection is provided in a form to be watertight, as is desirable or required in most cases. Since the space that can be occupied by these connections is also generally limited, it is also important that the connection take up no more space on the bulkhead than the usual non-insulated connection.

Figure 1:
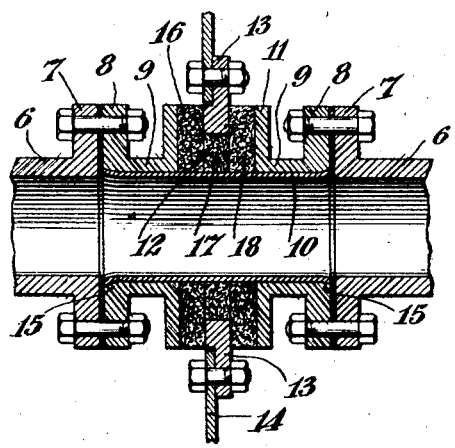
Figure 2:
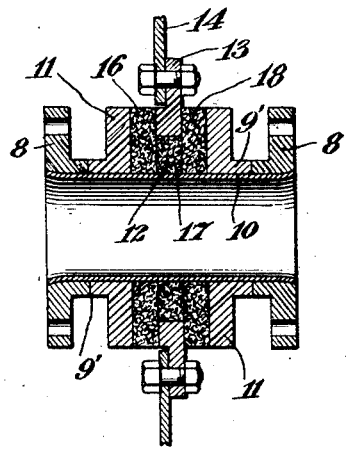

In the accompanying drawings illustrating the invention,

Fig. 1 is a vertical sectional view of a connection between the pipes and the bulkhead formed in accordance with this invention, and Fig. 2 to 5 are similar views of modifications.

In the construction shown in Fig. 1 the ends of the steam pipe sections 6 are provided with flanges 7 bolted to the flanges 8 of the intermediate insulating structure, this structure comprising annular ring portions 9 fitting on an integral sleeve 10 and having inner flanges 11 holding between them the heat insulation 12, which in turn supports the flange ring 13 for attachment to the bulkhead, partition or deck 14.

In the formation of this structure, the rings 9 and insulation 12 carrying the flange ring 13 are assembled on the sleeve 10 and endwise pressure is applied to compress the insulation firmly between the flanges 11, and in turn to grip the ring 13 in the insulation. While maintaining this pressure the sleeve 10 is expanded at the ends to fit tightly the rounded edges 15 of the rings 9 and bind all the parts securely together with the ring 13 gripped by the insulating material, which in turn is compressed between the flanges 9, as these are rigidly held by the sleeve 10. All of the parts are thus tightly held together in a unitary watertight structure without any danger of looseness or leakage between the parts.

As shown in Fig. 1 the insulation 12 is preferably formed of three annular pieces 16, 17, 18 with the middle piece 17 fitting tightly between the sleeve 10 and the flange ring 13. In the structure shown this insulation 17 is squeezed between the pieces 16 and 18 so as to press inward on sleeve 10 and outward in a radial direction on ring 13 in a strongly supporting manner. The gripping action of rings 16 and 18 on the sides of the ring 13 holds this ring against axial movement in either direction and also aids in supporting it radially. The compression and holding forces are thus distributed over the entire body of insulating material, so that the total holding force may be a maximum for the material used, and this material may be made up in simple moulded or cut rings of any heat insulating material best suited for the conditions of each particular installation.

The whole structure of the insulator is built up of standard materials and parts, and the structure itself takes up no more room than the usual non-insulating fitting. No special formation of the bulk head is required, or any special labor or machine work or parts. The workman is simply given the new insulating structure to use in place of the previous integral flange.

Figure 3:
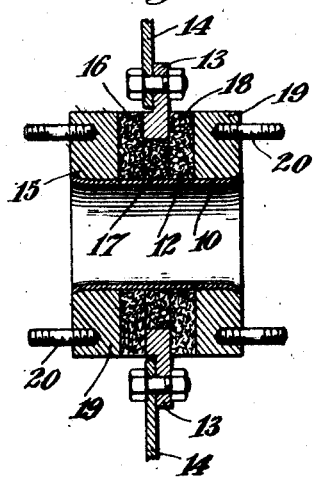
Figure 4:
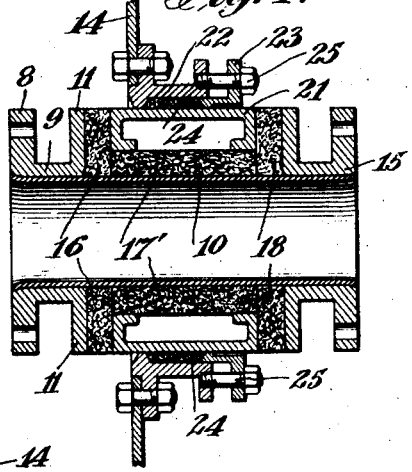

It will be apparent that various structural modifications may be resorted to without departing from the principle of the invention. For instance, each collar 9 may be divided into halves as shown at 9' in Fig. 2. As illustrated in Fig. 3, these end collars may be simple cylindrical rings 19 tapped to receive the studs 20 for the attachment of the pipe sections 6. Where the pipes are required to pass through bulkheads or deck stuffing boxes, the central ring 17' of insulating material may be elongated, as shown in Fig. 4, to carry a hollow composition cylinder 21 sliding in the stuffing box, also of composition material, provided by the flange ring 22 and compression ring 23 drawn against the packing material 24 by the bolts 25.

Figure 5:
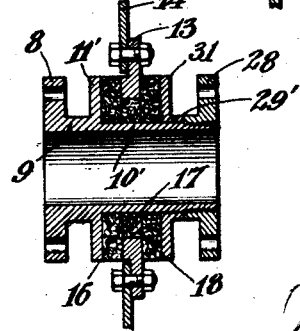

Instead of attaching the flanges to the sleeve member by expanding the latter, the flanges may be welded or threaded to the sleeve member, as shown in Fig. 5, where the member 10' has flanges 8 and 11 integral at one end, and flanges 28 and 31 on a ring member 29', which is screwed on to the other end of the sleeve member 10'.

The connector of this invention is thus provided in readily adaptable form, as a compact strong and durable unit. The stresses between the end pipe connections are borne by the integral sleeve member and the stresses from the partition are taken up in well distributed compressive forces on the insulating material. There are no holes through or projections on this insulating material, which is thus utilized in very simple and compact form, and in a position in the structure where it is surrounded by metal parts and protected against injury.

I claim:

1. A heat insulating connection for passing a heated fluid through a partition, bulkhead or the like comprising an outer member adapted to be attached to the partition, heat insulating material fastened to said outer member, and inner means fastened to said insulating material and providing attachment for a connecting pipe and a passage for carrying the heated fluid through said partition, so that the insulating material intervenes between said inner means and said outer member.

2. A unitary structure providing a connecting means for passing a heated fluid through a partition, bulkhead or the like comprising an inner tubular member having connecting means for attaching pipe sections at each end and passing the heated fluid from one pipe section to the other, an insulating material surrounding said tubular member and fastened thereto, and an outer ring member adapted to be attached to the partition and carried by said insulating material in spaced relation to the remainder of the structure, so that said insulating material intervenes between said inner member and said outer member.

3. A unitary structure providing a connecting means for passing a heated fluid through a partition, bulkhead or the like comprising an inner tubular member having connecting means for attaching pipe sections at each end and passing the heated fluid from one pipe section to the other, an insulating material comprising a plurality of annular sections fastened to said inner member, and an outer ring member adapted to be attached to the partition and carried by said insulating material in spaced relation to the remainder of the structure, so that said insulating material intervenes between said inner member and said outer member.

4. A unitary structure providing a connecting means for passing a heated fluid through a partition, bulkhead or the like comprising an inner tubular member having end flanges for attaching pipe sections at each end, and passing the heated fluid from one pipe section to the other, an insulating material compressed between said flanges and surrounding the central portion of said tubular member, and an outer ring member adapted to be attached to the partition and carried by said insulating material in spaced relation to the remainder of the structure, so that said insulating material intervenes between said inner member and said outer member.

5. A unitary structure providing a connecting means for passing a heated fluid through a partition, bulkhead or the like comprising an inner tubular member having flange rings at each end for attaching pipe sections and passing the heated fluid from one pipe section to the other, a plurality of rings of insulating material compressed between said flange rings, and an outer ring member gripped in turn between said rings of insulating material and adapted to be attached to the partition, the insulating material intervening between said outer ring member and said inner tubular member so as to space said members apart.

6. A unitary structure providing a connecting means for passing a heated fluid through a partition, bulkhead or the like comprising an inner tubular member having flange rings at each end for attaching pipe sections and passing the heated fluid from one pipe section to the other, a plurality of rings of insulating material compressed between said flange rings, and an outer ring member gripped in turn between said rings of insulating material and adapted to be attached to the partition, all of said parts of said unitary structure being permanently fastened together with the insuing material intervening between said outer ring member and said inner tubular member so as to space said members apart.

7. As an article of manufacture, a heat insulating connection comprising a fluid conducting member, insulating material carried thereby, and a flange adapted for connection to a suitable member, carried by said material thereby forming a unitary structure.

8. As an article of manufacture, a heat insulating connection comprising a fluid conducting member, insulating material carried thereby, and a flange adapted for connection to a suitable member, carried by said material, said insulating material being interposed radially between said conducting member and flange.

9. A heat insulating connection comprising a fluid conducting member adapted to conduct fluid through a partition, spaced flanges carried by said conducting member, insulating material carried by and surrounding said conducting member, and held in compressed relation by said flanges, and a supporting flange supported by said insulating material and held in spaced relation from the fluid conducting member by said insulation, said connection comprising a unitary structure which is adapted to be assembled with the partition by securing said supporting flange thereto.

10. A heat insulating connection, comprising a fluid conducting member, insulating material surrounding said member and carried thereby, and a member radially and axially supported by the insulation adapted for operative connection to a suitable support.

11. As an article of manufacture, a heat insulating connection comprising a fluid conducting member having spaced flanges, a flange intermediate of said other flanges, a section of insulating material interposed radially between said intermediate flange and fluid conducting member, and other sections of insulating material interposed axially between the intermediate flange and the other flanges.

JOHN F. METTEN.